(12) United States Patent
Nissen et al.

(10) Patent No.: US 11,043,138 B2
(45) Date of Patent: Jun. 22, 2021

(54) VR EMULATOR

(71) Applicant: Bell Helicopter Textron Inc., Fort Worth, TX (US)

(72) Inventors: Jeffrey Paul Nissen, Alba, TX (US); Daniel Brent McCall, Keller, TX (US); Joshua Peter Riccobono, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 440 days.

(21) Appl. No.: 15/928,644

(22) Filed: Mar. 22, 2018

(65) Prior Publication Data

US 2019/0130781 A1    May 2, 2019

Related U.S. Application Data (60) Provisional application No. 62/581,012, filed on Nov. 2, 2017.

(51) Int. Cl.
     *G09B 9/30*      (2006.01)
     *G09B 9/08*      (2006.01)
     (Continued)

(52) U.S. Cl.
     CPC ......... *G09B 9/307* (2013.01); *G02B 27/0172* (2013.01); *G06T 19/006* (2013.01);
     (Continued)

(58) Field of Classification Search
     CPC . G09B 9/307; G09B 9/12; G09B 9/24; G09B 9/085; G09B 9/30; G09B 9/08; G02B 27/0172; G02B 27/017; G06T 19/006
     See application file for complete search history.

(56) References Cited

U.S. PATENT DOCUMENTS 5,762,612 A    6/1998   Campbell
5,865,624 A    2/1999   Hayashigawa
(Continued)

FOREIGN PATENT DOCUMENTS

WO      2015059671 A1      4/2015

OTHER PUBLICATIONS

European Search Report in related European Application No. 18203764.8 dated Feb. 25, 2019, 5 pages.
(Continued)

*Primary Examiner* — Timothy A Musselman
(74) *Attorney, Agent, or Firm* — Lightfoot & Alford PLLC (57) ABSTRACT

Systems and methods include providing a virtual reality ("VR") flight emulator system that simulates control, operation, and response of a vehicle. The flight emulator includes a control interface and a head-mounted display worn by a user. Motion, orientation, and/or forces experienced by the simulated vehicle are imparted to a user through a motion-control seat. Multiple flight emulators can be connected to a communication network, and a master flight emulator may teleport into a slave flight emulator in order to observe, overtake, override, and/or assume control of the slave flight emulator. Inputs made via the control interface of the master flight emulator or during playback of a pre-recorded training exercise or flight mission are translated into the control interface, head-mounted display, and motion-control seat of the slave flight emulator to provide real-time feedback to the user of the slave flight emulator.

20 Claims, 4 Drawing Sheets

(51) Int. Cl.
    *G02B 27/01* (2006.01)
    *G06T 19/00* (2011.01)
    *G09B 9/12* (2006.01)
    *G09B 9/24* (2006.01)
(52) U.S. Cl.
    CPC ............... *G09B 9/085* (2013.01); *G09B 9/12* (2013.01); *G09B 9/24* (2013.01); *G02B 27/017* (2013.01)

(56) References Cited

U.S. PATENT DOCUMENTS

| | | | |
|---|---|---|---|
| 7,099,752 | B1 | 8/2006 | Lenell et al. |
| 8,755,965 | B1 | 6/2014 | McClintic |
| 10,529,248 | B2 * | 1/2020 | Chavez .................. G09B 9/302 |
| 2005/0233810 | A1 | 10/2005 | Chiang |
| 2006/0161871 | A1 | 7/2006 | Hotelling et al. |
| 2010/0302359 | A1 | 12/2010 | Adams et al. |
| 2010/0328204 | A1 | 12/2010 | Edwards et al. |
| 2014/0127666 | A1 | 5/2014 | Cevette et al. |
| 2015/0346722 | A1 | 12/2015 | Herz et al. |

OTHER PUBLICATIONS

European Exam Report in related European Application No. 18203764.8 dated Mar. 11, 2019, 6 pages.
Kharitonov, Vasily Y., "A Software Architecture for the High-Level Development of Component-Based Distributed Virtual Reality Systems," 2013 IEEE 37th Annual Computer Software and Applications Conference, Jul. 22, 2013, 10 pages, XP032517812.
European Exam Report in related European Patent Application No. 18203832.3 dated Oct. 2, 2019, 7 pages.
European Search Report in related European Patent Application No. 18203830.7 dated Oct. 2, 2019, 6 pages.
Behrman, Amy, "NAVAIR Demonstrates Successful Airborne Control of UAV", Apr. 5, 2003; XP055668839, retrieved from Internet: URL:https://www.navy.mil/submit/display.asp?story_id=6681.
European Exam Report in related European Patent Application No. 18203832.3 dated Feb. 27, 2020, 8 pages.
European Search Report in related European Patent Application No. 18203832.3 dated Mar. 29, 2019, 4 pages.
European Exam Report in related European Patent Application No. 18203832.3 dated Apr. 10, 2019, 8 pages.
European Search Report in related European Patent Application No. 18203830.7 dated Mar. 14, 2019, 4 pages.
European Exam Report in related European Patent Application No. 18203830.7 dated Mar. 27, 2019, 9 pages.
European Exam Report in related European Application No. 18203764.8 dated Sep. 13, 2019, 6 pages.
European Exam Report in related European Application No. 18203764.8 dated Oct. 21, 2020, 5 pages.
Anonymous: "CLS-E Rudder & CLS E-YOKE Bundle—BRUNNER," Aug. 16, 2017, pp. 1-7, XP055728814, retreived from the Internet: URL—https://web.archive.org/web/20170816104537/https://www.brunner-innovation.swiss/products/cls-e-yoke-bundle/ [retreived on Sep. 8, 2020].
European Exam Report in related European Patent Application No. 18203832.3 dated Jul. 17, 2020, 9 pages.
European Exam Report in related European Application No. 18203764.8 dated Mar. 30, 2021, 4 pages.

* cited by examiner

VR EMULATOR

CROSS-REFERENCE TO RELATED APPLICATIONS

This application claims priority under 35 U.S.C. § 119(e) to U.S. Provisional Patent Application No. 62/581,012 filed on Nov. 2, 2017 by Jeffrey Paul Nissen, et al., titled "VR Emulator," the disclosure of which is hereby incorporated by reference in its entirety.

STATEMENT REGARDING FEDERALLY SPONSORED RESEARCH OR DEVELOPMENT

Not applicable.

BACKGROUND

Military, commercial, and other operations generally involve a fleet of different vehicles. Operators of many of these vehicles often require extensive training in order to ensure safe and effective operation of their respective vehicles. However, training pilots of aircraft presents unique training challenges and safety concerns not traditionally present in training operators of ground vehicles, since physical flight of the aircraft requires the aircraft to be airborne.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
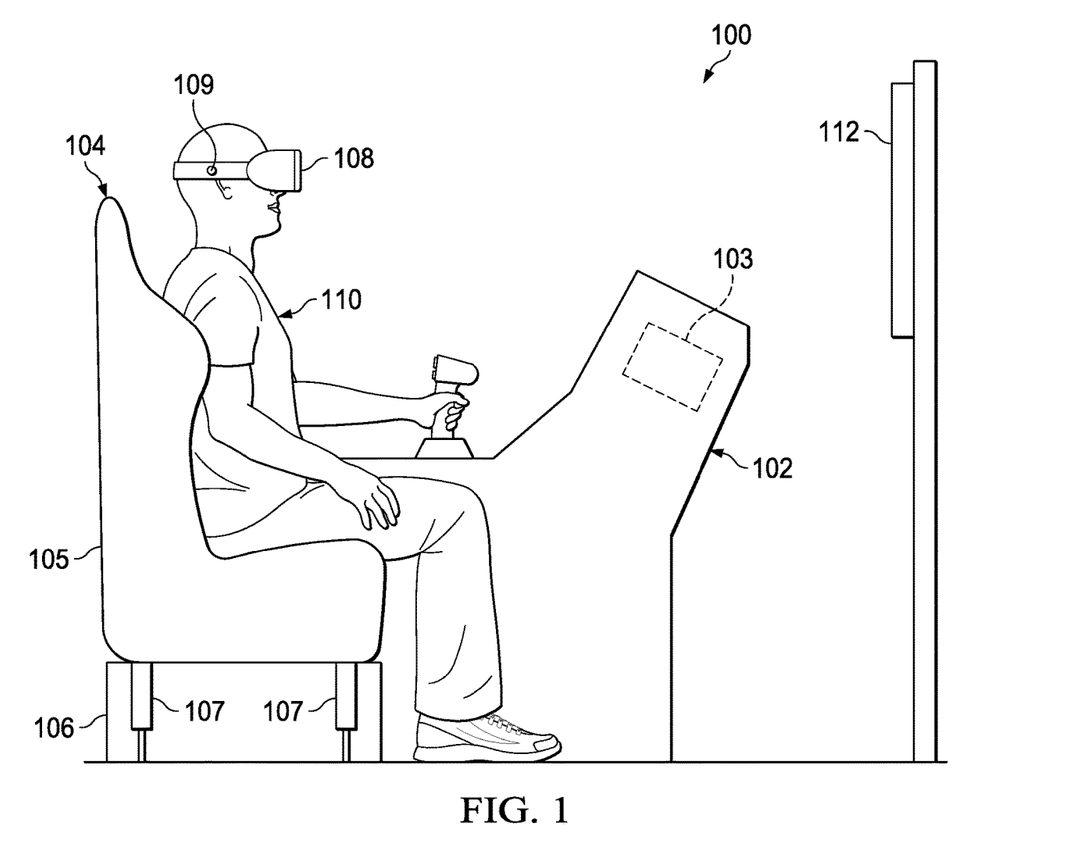
FIG. 1 is a side view of a virtual reality ("VR") flight emulator according to this disclosure.

Referring now to FIG. 1, a simplified side view of a virtual reality ("VR") flight emulator 100 is shown according to this disclosure. Flight emulator 100 generally comprises a virtual reality ("VR") system that simulates control, operation, and response of a vehicle, which may be a virtual vehicle or an actual remote vehicle (e.g. helicopter, tiltrotor, vertical take-off and landing (VTOL) aircraft, etc.), and allows a user 110 to provide inputs via a pilot control interface 102 to control, operate, and/or otherwise manipulate the vehicle. Further, it will be appreciated that while flight emulator 100 is described in the context of an aircraft, flight emulator 100 may also be applicable to other mobile equipment and vehicle types, including those found in automotive, construction, and marine applications. Flight emulator 100 comprises a pilot control interface 102, a motion-control seat 104 comprising a chair 105 and an articulating base 106 ((or other articulating support system for chair 105, such as a robotic arm in which geared motors provide the articulation) that is selectively articulated and/or manipulated via a plurality of actuators 107, and a head-mounted display 108 worn by a user 110 that comprises a plurality of sensors, emitters, and/or reflectors 109 configured to detect head movement of the user 110. In some embodiments, flight emulator 100 may also comprise an external display 112 that replicates images shown by the head-mounted display 108.

Pilot control interface 102 generally comprises physical and/or virtual flight control input hardware (e.g., flight input controls) configured to receive inputs and/or commands from a user 110 to control operation of the vehicle and make the vehicle respond. Pilot control interface 102 also comprises vehicle and environmental virtual reality ("VR") software 103 configured to respond to the inputs and/or commands from the user 110 and simulate vehicle operational response in a simulated environment in response to the inputs and/or commands from the user 110. The pilot control interface 102 is also configured to simulate operation of the vehicle through selective articulation of the motion-control seat 104 and selective displaying and/or adjusting graphical imagery shown to a user 110 on the head-mounted display 108. The pilot control interface 102 is generally specific to the vehicle of the flight emulator 100. However, in some embodiments, the pilot control interface 102 may comprise a generic system comprising basic inputs common to all aircraft or other vehicles. Additionally, as will be discussed later herein, the pilot control interface 102 may also be configured to control the simulated vehicle associated with the flight emulator 100 as well as a remote vehicle upon "teleporting" into the remote vehicle.

The motion-control seat 104 comprises a three, four, five, or up to six degrees of freedom articulating chair 105 that is attached to the articulating base 106. The degrees of freedom may comprise front-to-back motion, side-to-side motion, upwards/downwards motion, rotation about one or more axes, and/or any combination thereof. The articulating base 106 comprises a plurality of electric, electro-mechanical, magnetic, and/or hydraulic actuators 107 coupled to the pilot control interface 102. The actuators 107 are configured to selectively articulate or manipulate the motion-control seat 104 and/or portions of the base 106 to simulate the motion of, orientation of, and/or forces experienced by the vehicle being controlled. Accordingly, when a vehicle experiences motion, orientation, and/or forces as a result of operational parameters (e.g., speed, turning), environmental factors (e.g., wind gusts), and/or inputs of the user 110 through the pilot control interface 102, the motion-control seat 104 may be selectively articulated by the actuators 107 to simulate the motion of, orientation of, and/or forces acting on the vehicle and impart those on the user 110. Thus, it will be appreciated that the flight emulator 100 utilizes a control loading system (CLS) to input the realistic motion, orientation, and/or forces the actual vehicle would impose on the pilot and pilot control interface 102 to enhance user 110 experience in addition to vehicle response realism. Additionally, as will be discussed later herein in greater detail, the control loading system (CLS) of flight emulator 100 allows selective recording and playback of a training exercise or flight mission, which allows user 110 to receive feedback through the pilot control interface 102 and "feel" the control inputs used to pilot the simulated aircraft in the flight mission in order to provide training cues to a user 110.

The head-mounted display 108 comprises a virtual reality ("VR") display that is worn on the head of a user 110. The head-mounted display 108 displays imagery (e.g., simulated or actual environment) visible to the user 110 that simulates the imagery of an actual environment. The head-mounted display 108 is also configured to display portions of the pilot control interface 102 when the pilot control interface 102 is in the line of sight of user 110. The head-mounted display 108 comprises a plurality of sensors, emitters, and/or reflectors 109 that track head movement of the user 110. The sensors, emitters, and/or reflectors 109 and the head-mounted display 108 are each coupled to components and/or software 103 of the pilot control interface 102, such that the imagery displayed to a user 110 on the head-mounted display 108 changes in response to head movement of the user 110 and consequently movement of the sensors, emitters, and/or reflectors 109. For example, when user 110 looks forward, user 110 may see through the windshield of a cockpit of a vehicle and portions of the pilot control interface 102, and when user 110 looks to the left, user 110 may see a co-pilot or leftward portions of the pilot control interface 102.

In operation, flight emulator 100 provides a user 110 with simulated experience of operating a virtual vehicle in a simulated environment or a remote vehicle in an actual environment. When user 110 provides inputs through the pilot control interface 102, the actuators 107 are selectively operated to articulate or manipulate the motion-control seat 104 to simulate the effect of the motion, orientation, and/or forces on the vehicle caused by the inputs of the user 110 that would be experienced by an actual vehicle. Additionally, the head-mounted display 108 may continuously adjust the imagery displayed to the user 110 to replicate what an actual user would see in an actual vehicle in response to the motion detected by the sensors, emitters, and/or reflectors 109. For example, if user 110 provides an input to turn to the left, actuators 107 may be selectively operated to tilt the motion-control seat 104 to the left to simulate the "bank" of the turn as would be experienced by an actual aircraft, while also adjusting the imagery displayed to a user on the head-mounted display 108 to show the orientation of the aircraft relative to the ground. In a further example, actuators 107 may be selectively operated to provide vibration of the motion-control seat 104 as would be experienced by actual aircraft in addition to the pilot control interface 102, for example, alerting the user 110 as to excessive speed or approaching stall speed and/or other known limits of the aircraft.

Figure 2:
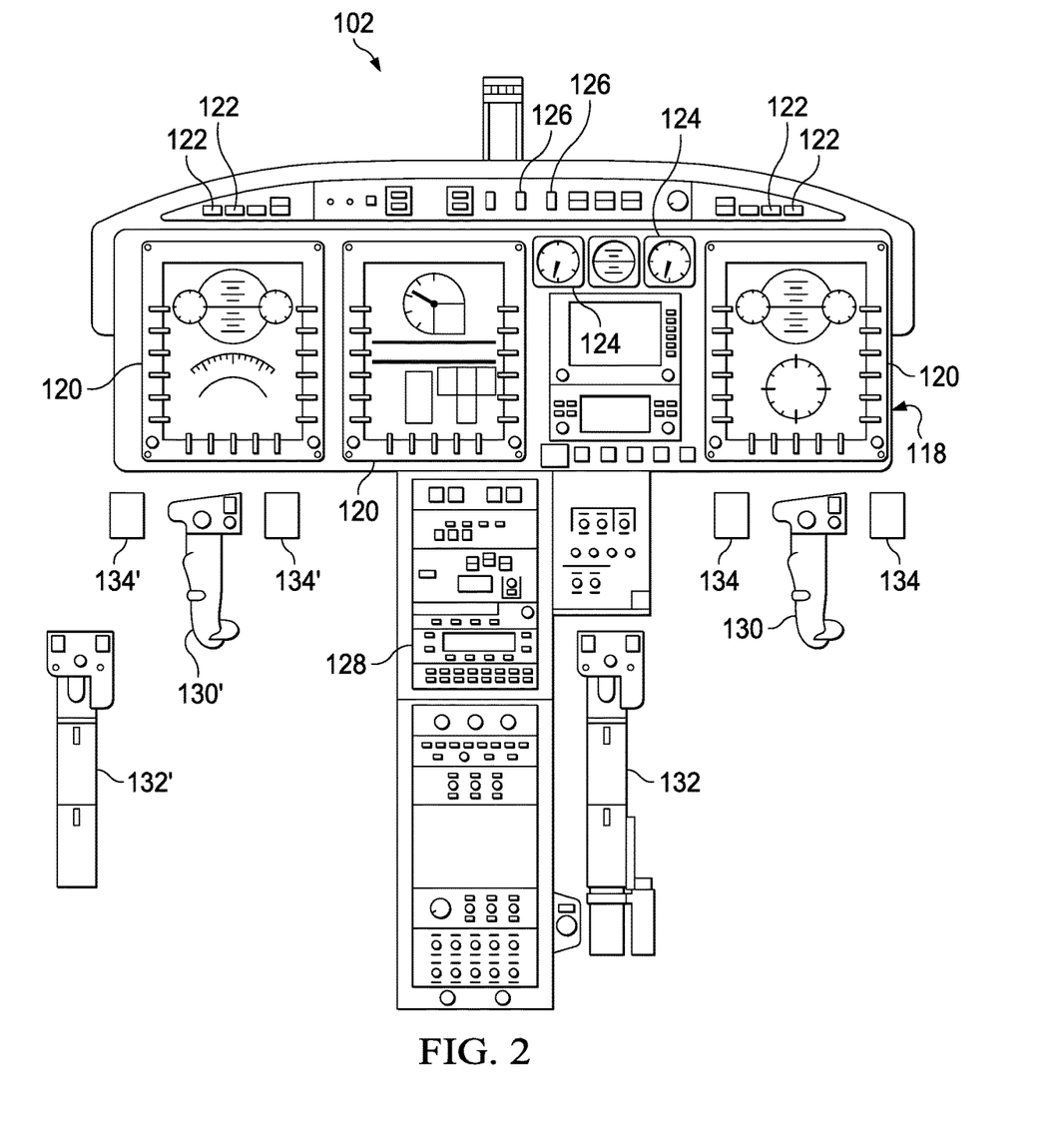
FIG. 2 is a diagram of a pilot control interface according to this disclosure.

Referring now to FIG. 2, a diagram of a pilot control interface 102 is shown according to this disclosure. In the embodiment shown, pilot control interface 102 comprises an instrument panel 118 comprising a plurality of touchscreen displays 120, warning and/or notification lights 122, mechanical and/or electrical gauges 124, mechanical and/or electrical switches 126, and/or other instrumentation 128 necessary to communicate and/or adjust operational parameters of a vehicle. However, in some embodiments, the pilot control interface 102 may comprise a virtual instrument panel 118 of a remote vehicle. Further, in some embodiments, the pilot control interface 102 may comprise a blank virtual display or multiple displays that populate with the appropriate gauges when the head mounted display 108 is worn by a user 110. Pilot control interface 102 may also comprise cyclic control 130, collective control 132, and/or pedals 134 for selectively manipulating operation of the vehicle. Additionally, in some embodiments, pilot control interface 102 may also comprise co-pilot cyclic control 130', co-pilot collective control 132', and/or co-pilot pedals 134'. In some embodiments, one or more touchscreen displays 120 may display a list of all vehicles connected through a network. Additionally, one or more touchscreen displays 120 may selectively alter their respective displays depending on the type of vehicle being controlled. As such, a single pilot control interface 102 or flight emulator 100 may be configured to emulate multiple vehicles.

Instrument panel 118 may generally comprise any combination of virtual, physical, simulated, and/or actual components 120, 122, 124, 126, 128, 130, 130', 132, 132', 134, 134' that allow a user 110 control over a vehicle. In some embodiments, instrument panel 118 may comprise a mock instrument panel that allows actual physical interaction by a user 110 with one or more of the actual components 120, 122, 124, 126, 128, 130, 130', 132, 132', 134, 134' that would be present in an actual vehicle. As such, the head-mounted display 108 may be at least partially augmented or transparent to allow a user 110 to see and interact with one or more components 120, 122, 124, 126, 128, 130, 130', 132, 132', 134, 134'. However, in some embodiments, one or more of the components 120, 122, 124, 12, 128, 130, 130', 132, 132', 134, 134' on the instrument panel 118 may comprise a non-functioning "dummy" component. Additionally, the instrument panel 118 may comprise a plurality of sensors and/or cameras in a virtual dash that anticipate or detect movement (e.g. arm motion, head motion) of a user 110 towards a component 120, 122, 124, 126, 128, 130, 130', 132, 132', 134, 134' to anticipate a command in order to reduce latency in the pilot control interface 102. For example, one or more instrument panels 118 or touchscreen displays 120 may comprise a blank panel that detects hand or arm movement of a user 110 to cause an input into the pilot control interface 102. Further, one or more touchscreen displays 120 may change its display depending on whether the flight emulator 100 is being used to control the simulated vehicle or a remote vehicle.

Figure 3:
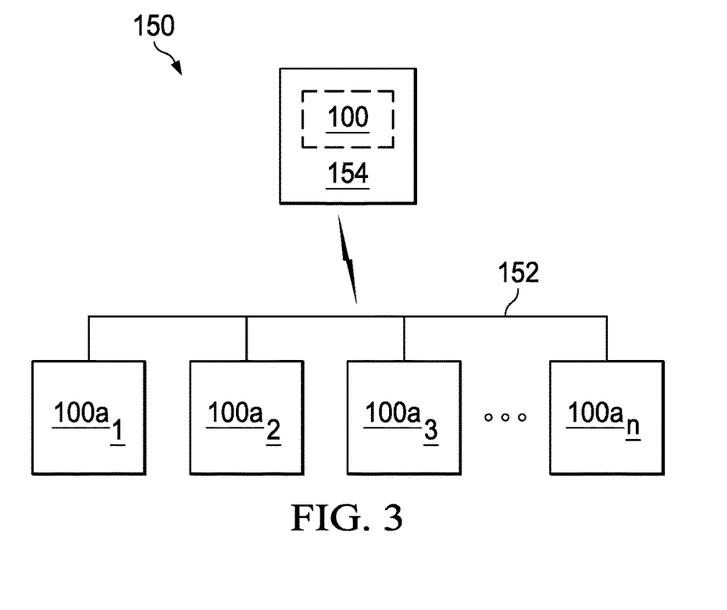
FIG. 3 is a schematic diagram of a virtual reality ("VR") flight emulator system according to this disclosure.

Referring now to FIG. 3, a schematic diagram of a virtual reality ("VR") flight emulator system 150 is shown according to this disclosure. Flight emulator system 150 comprises a plurality of flight emulators 100 selectively connected in communication through network 152, which may be wired, wireless, or any combination thereof. It will be appreciated that flight emulator system 150 may comprise any number of flight emulators 100. Additionally, in some embodiments, flight emulator system 150 may also comprise a master flight emulator 154. Master flight emulator 154 comprises a flight emulator 100 selectively connected in communication with each of the plurality of slave flight emulators $100a_{1-n}$ through network 152. However, master flight emulator 154 also comprises the capability to selectively "teleport" a user 110 into a slave flight emulator $100a_{1-n}$ to assume control of the pilot control interface 102 of any of the slave flight emulators $100a_{1-n}$ connected through the network 152. In some embodiments, this capability may be encoded in the software 103 or made possible through components of the pilot control interface 102 of the master flight emulator 154. However, in other embodiments, this capability may be present in each of the flight emulators 100 but overridden or disabled in each of the slave flight emulators $100a_{1-n}$ by the master flight emulator 154.

By connecting multiple flight emulators 100 through network 152, the flight emulators 100 may be flown in the same simulated environment. This allows for multi-vehicle training that may require operating a mix of various aircraft simultaneously to build teaming protocol and flight patterns. As such, an instructor in the master flight emulator 154 may monitor each of the flight emulators 100 operated by a user 110. In some embodiments, the master flight emulator 154 may not be simulating a vehicle actively participating in a training exercise on the network 152. Thus, an instructor in the master flight emulator 154 may teleport into a slave flight emulator $100a_{1-n}$ without taking over control of the pilot control interface 102. This is referred to as a passive teleport. In a passive teleport, the instructor in the master flight emulator 154 sees the simulated environment visible to the slave flight emulator $100a_{1-n}$ that the instructor in the master flight emulator 154 has teleported into through the head-mounted display 108 associated with the master flight emulator 154. In some embodiments, the head-mounted display 108 worn by the instructor in the master flight emulator 154 may replicate imagery seen by the user in the slave flight emulator $100a_{1-n}$. However, in some embodiments, the head-mounted display 108 worn by the instructor in the master flight emulator 154 may operate independently and replicate imagery based on head movement of the instructor.

When the instructor has teleported into a slave flight emulator $100a_{1-n}$, the motion of, orientation of, and/or forces acting on a master aircraft controlled by the master flight emulator 154 are minimized or preferably cancelled through articulation of the motion-control seat 104 of the master flight emulator 154, and the motion-control seat 104 is further articulated such that the instructor in the master flight emulator 154 experiences the motion of, orientation of, and/or forces acting on the slave flight emulator $100a_{1-n}$ into which the instructor in the master flight emulator 154 has teleported. However, if the master flight emulator 154 is not simulating a vehicle actively participating in a training exercise, the motion-control seat 104 of the master flight emulator 154 is simply selectively articulated to emulate motion, orientation, and/or forces experienced by the slave flight emulator $100a_{1-n}$. In both scenarios, this allows the instructor in the master flight emulator 154 to "feel" only the motion of, orientation of, and/or forces acting on the slave flight emulator $100a_{1-n}$.

Still further, once teleported into a slave flight emulator $100a_{1-n}$, the instructor preferable also receives feedback through the pilot control interface 102 and instrument panel 118 of the master flight emulator 154 in response to a user 110 in the slave flight emulator providing inputs through the pilot control interface 102 of the slave flight emulator $100a_{1-n}$. Thus, for example, the instructor feels the amount of force or movement a user 110 may be using to manipulate the cyclic control 130, collective control 132, and pedals 134 of the slave flight emulator $100a_{1-n}$. The instructor further may be able to observe readings on the gauges 124 and position of switches 126 of the slave flight emulator $100a_{1-n}$ through emulation of the pilot control interface 102 of the slave flight emulator $100a_{1-n}$ through the pilot control interface 102 of the master flight emulator 154. This allows the instructor to fully observe operation of the slave flight emulator $100a_{1-n}$ as if the instructor were actually in the slave flight emulator $100a_{1-n}$.

By teleporting into a slave flight emulator $100a_{1-n}$ the instructor in the master flight emulator 154 may also selectively assume control of the pilot control interface 102 of a slave flight emulator $100a_{1-n}$. This is referred to as an active teleport. In the active teleport, the instructor in the master flight emulator 154 provides inputs through the pilot control interface 102 of the master flight emulator 154 that are emulated into the slave flight emulator $100a_{1-n}$. In some embodiments, the pilot control interface 102 of the slave flight emulator $100a_{1-n}$ may be locked out, such that a user 110 may not provide inputs. However, the components of the pilot control interface 102 of the slave flight emulator $100a_{1-n}$ are operated in accordance with inputs made by the instructor through the pilot control interface 102 of the master flight emulator 154. This allows the instructor in the master flight emulator 154 to operate the slave flight emulator $100a_{1-n}$, while the user 110 in the slave flight emulator $100a_{1-n}$ receives real-time feedback and "feels" the amount and direction of inputs made by the instructor in the master flight emulator 154 in addition to the response of the simulated vehicle associated with the slave flight emulator $100a_{1-n}$ in response to the instructor inputs.

Additionally, in the active teleport, the head-mounted display 108 worn by the instructor in the master flight emulator 154 replicates imagery from the slave flight emulator $100a_{1-n}$. Thus, the instructor in the master flight emulator 154 may selectively observe gauges, instruments, and controls in the slave flight emulator $100a_{1-n}$ that may not be replicated by the pilot control interface 102 of the master flight emulator 154 when teleported. Additionally, the head-mounted display 108 worn by the instructor in the master flight emulator 154 also tracks head movement of the instructor via the sensors, emitters, and/or reflectors 109 and responsively adjusts the imagery displayed to the instructor on the head-mounted display 108, thereby allowing the instructor to selectively observe the simulated environment surrounding the slave flight emulator $100a_{1-n}$. Accordingly, feedback through the pilot control interface 102, the motion-control seat 104, and the head-mounted display 108 of the master flight emulator 154 provides real-time emulation capability that allows the instructor to fully observe and control operation of the slave flight emulator $100a_{1-n}$ when teleported as if the pilot of the master flight emulator 154 were actually in the slave flight emulator $100a_{1-n}$.

Furthermore, in the active teleport, inputs made by the instructor that impart motion, orientation, and/or forces into the vehicle associated with the slave flight emulator $100a_{1-n}$ are emulated for the user 110 through selective articulation of the motion-control seat 104 of the slave flight emulator $100a_{1-n}$. This also allows the user 110 to associate correct inputs made by the instructor and associated response of the simulated vehicle. For example, where a user 110 is providing too much input on a cyclic control 130, the instructor may teleport into the slave flight emulator $100a_{1-n}$ of the user 110 and provide the correct cyclic control 130 input necessary to make a smooth, wide-radius turn or correct collective control 132 input necessary for a smooth takeoff or landing. As such, this real-time feedback to the user 110 may help a user 110 in more effectively learning the correct inputs to properly operate a vehicle associated with a slave flight emulator $100a_{1-n}$.

Flight teleport system 150 is also capable of utilizing the control loading system (CLS) of a flight emulator 100 to selectively record and playback a training exercise or flight mission, thereby allowing a user 110 to receive feedback through the pilot control interface 102 and "feel" the control inputs necessary to expertly pilot the simulated vehicle without having a training instructor physically present. Additionally, playback of a training exercise or flight mission also imparts motion, orientation, and/or forces to a user 110 by selectively articulating the motion-control seat 104 of each flight emulator 100, thereby allowing a user 110 to associate inputs with various responses of the simulated vehicle while also providing visual imagery through the head-mounted display 108 of each flight emulator 100. Playback of a training exercise or flight mission may be recorded from previous training exercises or simulated preprogrammed missions which provide correct inputs in response to various changes in operational parameters or environmental factors. Further, since multiple flight emulators 100 can be connected through network 152, playback may control multiple flight emulators 100 simultaneously, allowing several users 110 to experience feedback from a single simulated vehicle or a fleet of various simulated vehicles.

Figure 4:
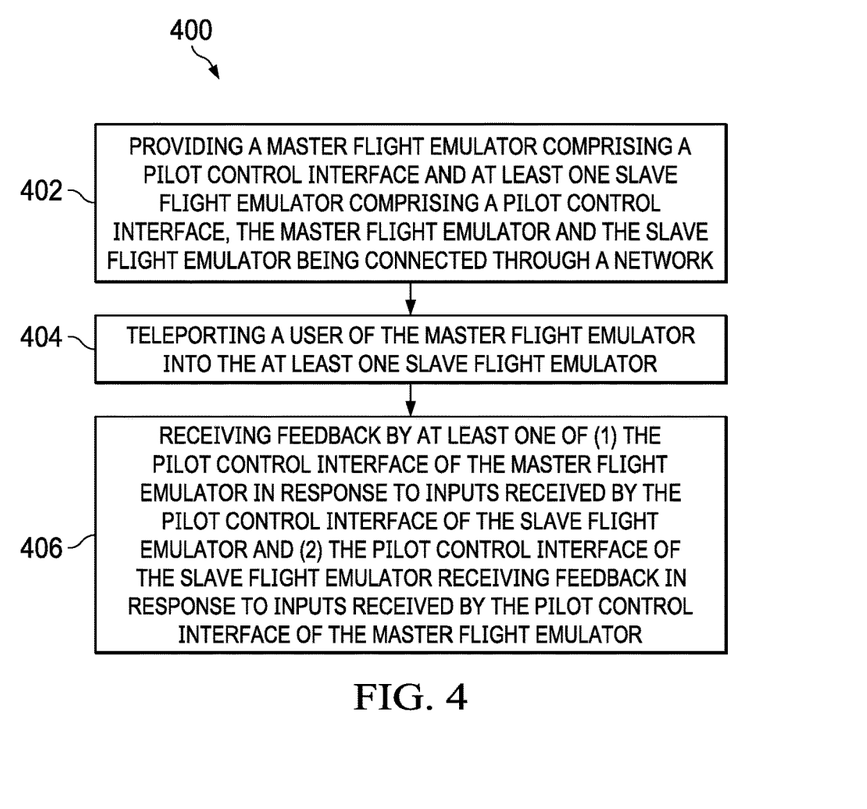
FIG. 4 is a flowchart of a method of operating a virtual reality ("VR") flight emulator system according to this disclosure.

Referring now to FIG. 4, a flowchart of a method 400 of operating a virtual reality ("VR") flight emulator system 150 is shown according to this disclosure. Method 400 begins at block 402 by providing a roaster flight emulator 154 comprising a pilot control interface 102 and also at least one slave flight emulator 100 comprising a pilot control interface 102, the master flight emulator 154 and the slave flight emulator 100 being connected through a network 152. Method 400 continues at block 404 by teleporting a user 110 of the master flight emulator 154 into the at least one slave flight emulator 100. Method 400 concludes at block 406 by receiving feedback through at least one of (1) the pilot control interface 102 of the master flight emulator 154 in response to inputs received by the pilot control interface 102 of the slave flight emulator 100 and (2) the pilot control interface 102 of the slave flight emulator 100 in response to inputs received by the pilot control interface 102 of the master flight emulator 154. Receiving feedback through the pilot control interface 102 is accomplished through adjustment, movement, selection, or change of display of components 120, 122, 124, 126, 128, 130, 130', 132, 132', 134, 134' of the pilot control interface 102. Additionally, it will be appreciated that feedback may also be imparted through selective operation of the actuators 107 to articulate motion-control seat 104 in the slave flight emulator 100 and/or the master flight emulator 154. Further, it will be appreciated that feedback may further be imparted by replicating visual images seen by user 110 of the slave flight emulator through the head-mounted display 108 of the user 110 of the master flight emulator 154.

Figure 5:
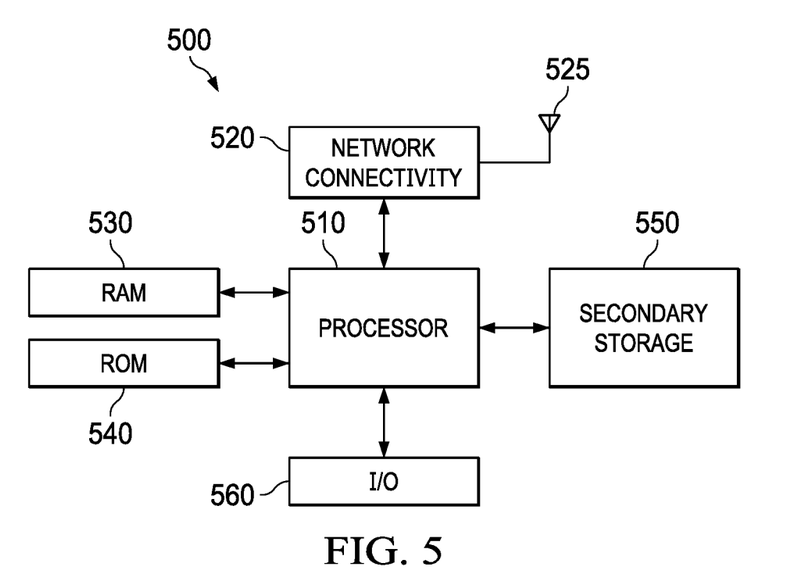
FIG. 5 is a schematic diagram of a general-purpose processor (electronic controller or computer) system suitable for implementing the embodiments of this disclosure.

Referring now to FIG. 5, a schematic diagram of a general-purpose processor (e.g. electronic controller or computer) system 500 suitable for implementing the embodiments of this disclosure is shown. System 500 that includes a processing component 510 suitable for implementing one or more embodiments disclosed herein. Particularly, each of the above-described flight emulators 100, pilot control interfaces 102, instrument panels 118, and/or flight emulator systems 150 may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors, or other well-known input or output devices. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of the above-described flight emulators 100, pilot control interfaces 102, instrument panels 118, and/or flight emulator systems 150.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiments) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A virtual reality ("VR") flight emulator, comprising:
a pilot control interface;
a head mounted display worn by a user;
an instrument panel comprising at least one sensor; and
a motion-control seat;
wherein the flight emulator is configured to allow the user of the flight emulator to virtually teleport into a slave flight emulator connected through a network; and
wherein the at least one sensor detects a motion of the user for use by the flight emulator in anticipating an input to the pilot control interface.

2. The flight emulator of claim 1, wherein the pilot control interface of the flight emulator is configured to receive feedback in response to an input made via a pilot control interface of the slave flight emulator when the user of the flight emulator is virtually teleported into the slave flight emulator.

3. The flight emulator of claim 2, wherein the motion-control seat is selectively articulated to minimize motion and orientation of a vehicle associated with the flight emulator and impart only the motion and orientation acting on the slave flight emulator when the user of the flight emulator is virtually teleported into the slave flight emulator.

4. The flight emulator of claim 1, wherein the pilot control interface of the flight emulator is configured to assume control of a pilot control interface of the slave flight emulator when the user of the flight emulator is virtually teleported into the slave flight emulator.

5. The flight emulator of claim 4, wherein inputs made via the pilot control interface of the flight emulator are emulated at the pilot control interface of the slave flight emulator when the user of the flight emulator is virtually teleported into the slave flight emulator.

6. The flight emulator of claim 5, wherein inputs made via the pilot control interface of the flight emulator for operating a vehicle associated with the slave flight emulator are emulated through selective articulation of the motion-control seat of the flight emulator.

7. The flight emulator of claim 6, wherein the flight emulator comprises a head-mounted display worn by the user of the flight emulator, and wherein the head-mounted display is configured to replicate visual imagery from the slave flight emulator and further configured to adjust the imagery in response to head movement of the user of the flight emulator.

8. The flight emulator of claim 1, wherein the flight emulator is configured to run a pre-recorded program, wherein the pre-recorded program provides feedback through each of a pilot control interface and a motion-control seat of the slave flight emulator.

9. A virtual reality ("VR") flight emulator system, comprising:
a master flight emulator comprising a pilot control interface and a motion-control seat;
an instrument panel comprising at least one sensor configured to detect a motion of the user for use by the master flight emulator in anticipating an input to the pilot control interface: and
at least one slave flight emulator comprising a pilot control interface and a motion-control seat and connected in communication to the master flight emulator through a network;
wherein the master flight emulator is configured to allow a user of the master flight emulator to virtually teleport into the slave flight emulator.

10. The flight emulator system of claim 9, wherein the pilot control interface of the master flight emulator is configured to receive feedback in response to an input made via the pilot control interface of the slave flight emulator when the user of the master flight emulator is virtually teleported into the slave flight emulator.

11. The flight emulator system of claim 10, wherein the motion-control seat of the master flight emulator is selectively articulated to cancel motion and orientation of a vehicle associated with the slave flight emulator and impart only the motion and orientation acting on the slave flight emulator when the user of the master flight emulator is virtually teleported into the slave flight emulator.

12. The flight emulator system of claim 9, wherein the pilot control interface of the master flight emulator is configured to assume control of the pilot control interface of the slave flight emulator when the user of the master flight emulator is virtually teleported into the slave flight emulator.

13. The flight emulator system of claim 12, wherein inputs made via the pilot control interface of the master flight emulator are imparted to the pilot control interface of the slave flight emulator when the user of the master flight emulator is virtually teleported into the slave flight emulator.

14. The flight emulator system of claim 13, wherein inputs made via the pilot control interface of the master flight emulator that impart motion or orientation to a vehicle associated with the slave flight emulator are imparted to the user of the master flight emulator through selective articulation of the motion-control seat of the master flight emulator.

15. The flight emulator system of claim 14, wherein the master flight emulator comprises a head-mounted display worn by the user of the master flight emulator, and wherein the head-mounted display is configured to replicate visual imagery visible from the slave flight emulator and further configured to adjust the imagery in response to head movement of the user of the master flight emulator detected by a plurality of sensors, emitters, or reflectors.

16. The flight emulator system of claim 9, wherein the master flight emulator is configured to run a pre-recorded program, wherein the pre-recorded program provides feedback through each of the pilot control interface and the motion-control seat of the slave flight emulator.

17. A method of operating a virtual reality ("VR") flight emulator, comprising:

providing a master flight emulator comprising: a pilot control interface, an instrument panel comprising at least one sensor configured to detect a motion of the user for use by the master flight emulator in anticipating an input to the pilot control interface, and a motion-control seat; and at least one slave flight emulator comprising a pilot control interface and a motion-control seat, the master flight emulator and the slave flight emulator being connected through a network;

virtually teleporting a user of the master flight emulator into the at least one slave flight emulator; and receiving feedback through at least one of (1) the pilot control interface and the motion-control seat of the master flight emulator in response to inputs received by the pilot control interface of the slave flight emulator and (2) the pilot control interface and the motion-control seat of the slave flight emulator in response to inputs received by the pilot control interface of the master flight emulator.

18. The method of claim 17, wherein the receiving feedback is further accomplished via displaying imagery on a head-mounted display worn by the user of the master flight emulator.

19. The method of claim 18, further comprising: adjusting the imagery displayed on the head-mounted display in response to head movement of the user of the master flight emulator detected by a plurality of sensors, emitters, or reflectors.

20. The method of claim 17, further comprising: running a pre-recorded program configured to provide feedback through the pilot control interface and the motion-control seat of the slave flight emulator.

* * * * *